April 14, 1953     J. E. POINTON     2,634,693
BAKER'S SWING TRAY CONVEYER AND LIKE OVEN
Filed May 20, 1947     3 Sheets-Sheet 1
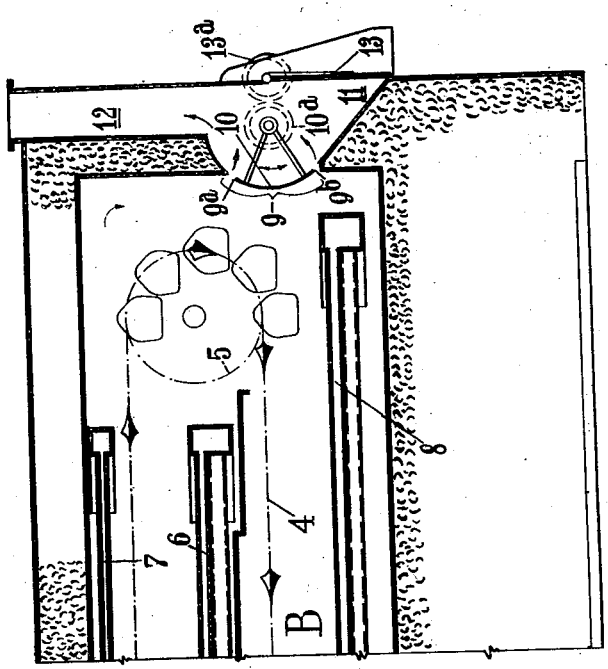
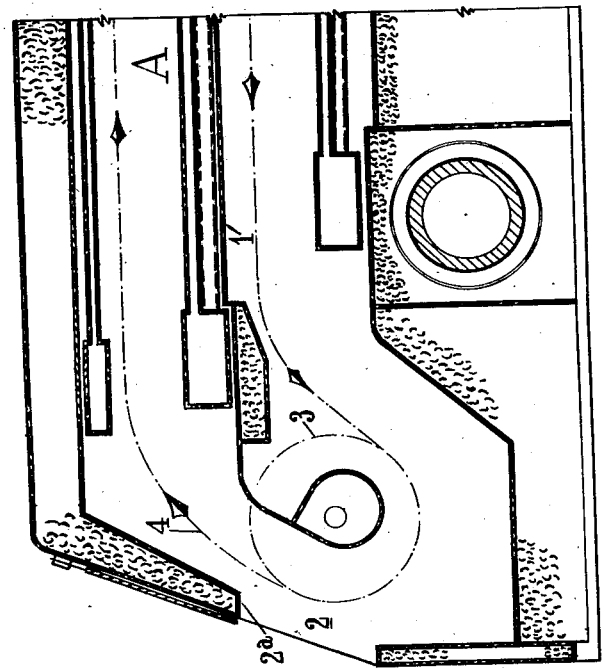
Fig.1.
Inventor
J. E. Pointon April 14, 1953  J. E. POINTON  2,634,693
BAKER'S SWING TRAY CONVEYER AND LIKE OVEN
Filed May 20, 1947  3 Sheets-Sheet 2

Inventor
J. E. Pointon
By Stesent Downing Seebohl
Attys

April 14, 1953  J. E. POINTON  2,634,693
BAKER'S SWING TRAY CONVEYER AND LIKE OVEN
Filed May 20, 1947  3 Sheets-Sheet 3
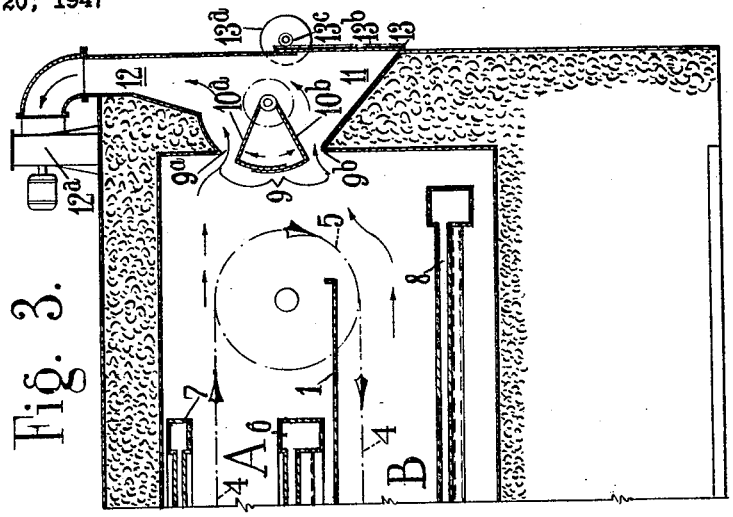
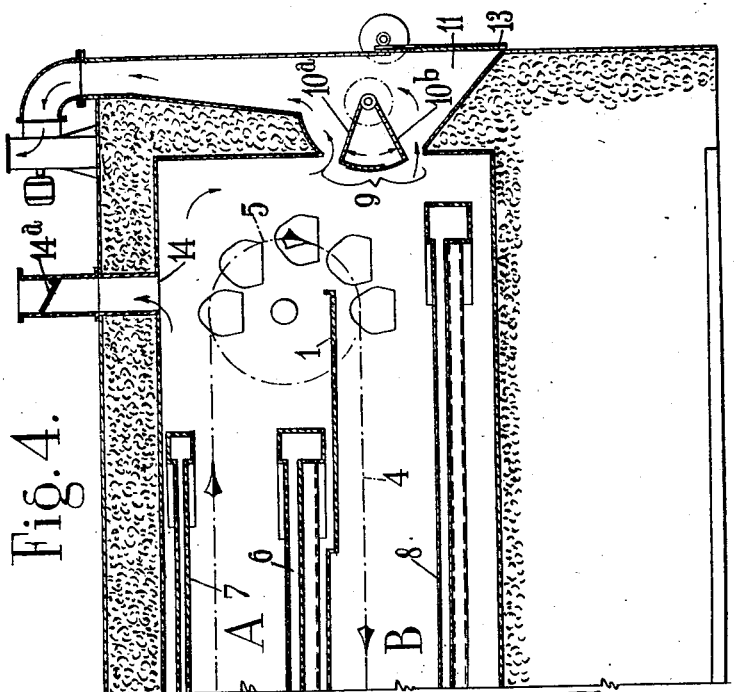
Inventor
J. E. Pointon Patented Apr. 14, 1953

2,634,693

UNITED STATES PATENT OFFICE 2,634,693

BAKER'S SWING TRAY CONVEYER AND LIKE OVEN

John Edward Pointon, Peterborough, England, assignor to Baker Perkins Limited, Peterborough, England Application May 20, 1947, Serial No. 749,210
In Great Britain May 24, 1946

4 Claims. (Cl. 107—55)

This invention relates to ovens for baking bread and the like of the type wherein charging and delivery both take place at the front of the oven and in which is employed a swing tray conveyor or like endless conveyor having one lap running in an upper chamber and the other travelling in a lower chamber, the chambers being separated by horizontally extending partition means. An oven of the above type is described in connection with prior Patent No. 2,205,576, June 25, 1940.

In ovens of the above type it is customary to admit steam to the upper chamber in order to carry out the initial baking stage in a steamy atmosphere. Some of this steam, however, is carried into the lower chamber, and with the steam given off by the bread may result in the steam treatment being prolonged or the bread being baked in a steamy atmosphere throughout.

When dough is baked in a steamy atmosphere throughout the tray conveyor travel the baked loaves, although of good development and of regular or symmetrical shape, may possess a tougher crust than is popular; and an aim of the present invention is to provide improvements in ovens of the above type in which baking conditions are established which result in a loaf not only possessing good bloom, full development and a symmetrical form, but one in which the crust is crisp and devoid of the undesirable toughness referred to above. A further advantage achieved by the invention as will be appreciated from what follows lies in the prevention of the emission of heat or steamy atmosphere at the charging door.

The invention consists in aiding in the exclusion of the passage of steam from one chamber, wherein the bread is baked in the steamy atmosphere, to the other chamber of the oven by withdrawing at the rear of the oven a proportion of the atmosphere from the chamber first mentioned.

The invention also consists in aiding in the exclusion of steam from passing from one chamber, wherein the bread is baked in a steamy atmosphere, to the other chamber of the oven by maintaining in the latter chamber a movement of the atmosphere therein from the front towards the rear of the oven by withdrawing a proportion of said atmosphere at the rear of the oven.

In the preferred form the conditions are controlled such that in both chambers a movement of the oven atmosphere is promoted from the front to the rear of the oven, by withdrawing from the rear of the oven adjustable proportions of the atmosphere from both chambers.

The withdrawal of atmosphere as specified above may be effected by the provision of a single valve-controlled outlet at the rear of the oven which serves to draw off a proportion of the atmosphere from both the upper and lower chambers concurrently. Or, alternatively, two valve-controlled spaced outlets at the rear of the oven may be provided, one for the upper chamber and the other for the lower chamber. The provision of valve means in the outlet (or outlets) enables the withdrawal to be regulated according to the various baking conditions required. The valve means may be adjustable independently, or such may be adjustable so that as the rate of withdrawal from one chamber is diminished the rate of withdrawal from the other chamber is increased.

According to a modification the atmosphere extracted through the rearward outlet (or outlets) may be redirected by conduit means back into the oven in a suitable position and in adjustable proportions, and it is preferred that the location of the recirculation entry should be in the vicinity of or over the rear end of the oven conveyor such that the recirculated atmosphere in passing towards the rear extraction outlet (or outlets) forms a curtain tending further to prevent steam from the upper chamber finding its way into the lower chamber.

The extraction outlet (or outlets) is connected to a source of suction which may be the natural draught of a chimney flue or such may be produced by a suction fan. The suction may be regulated by throttling means but it is preferred to use an adjustable vent by which atmospheric air may be let into the suction conduit or flue to diminish the suction effect.

In the accompanying drawings:

Figure 1 is a diagrammatic side elevation of a swing tray conveyor oven of the type above indicated, illustrating the application of the invention thereto by the provision of a single outlet at the rear of the oven controlled by a single valve member.

Figure 3 is a fragmentary side elevation of the rear of an oven as shown in Figure 1 illustrating a modification in which the outlet located at the rear of the oven is controlled by a pair of valve members.

Figure 4 is a diagrammatic sectional elevation of an oven of the type indicated, showing an example of the application of the invention thereto by providing outlets at the rear of the oven, one in the roof and the other in the lower part of the end wall.

Figure 5:
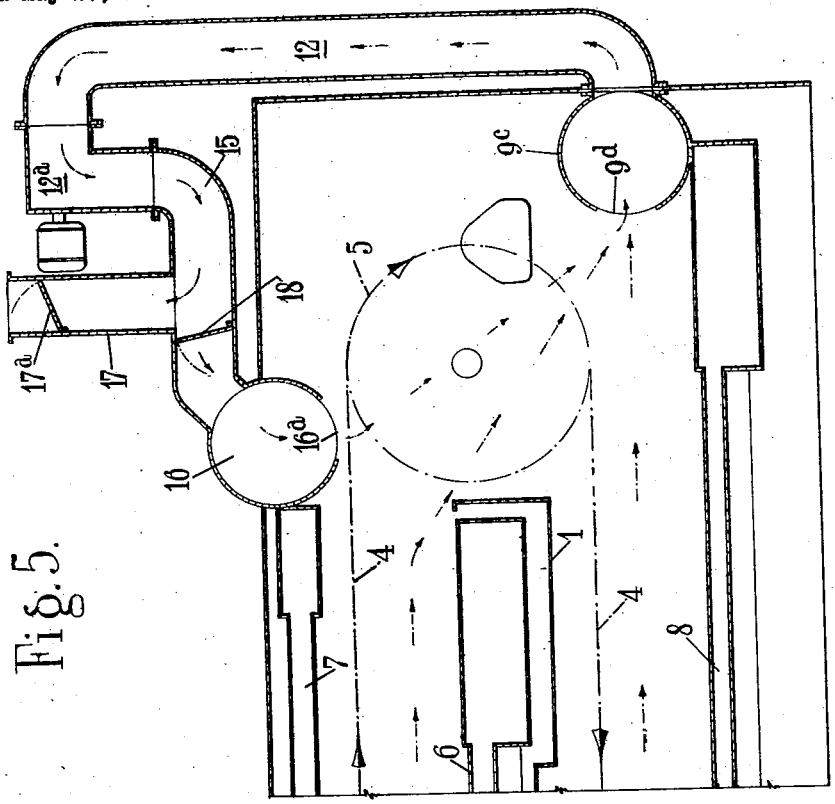
Figure 5 is a diagrammatic fragmentary side elevation of an oven of the above type illustrating a modification in which the oven atmosphere is withdrawn by means of a transverse conduit located at the rear of and within the oven and coupled by conduit means for recirculation and re-entry of a proportion of the atmosphere over the rear turning point wheels of the oven conveyor.

In carrying the invention into effect according to one example, see Figures 1 and 2, the partition 1 dividing the two chambers A and B is located in a horizontal plane substantially level with the upper edge 2a of the door or oven feed opening 2, and the front turning point wheels 3 of the conveyor 4 are located below the partition level such that at the front of the oven the trays travel upwardly before passing to the upper horizontal lap of the conveyor in chamber A, whilst on the return lap of the conveyor in the lower chamber B the trays approaching the front turning point are led in a downward direction around the wheels 3 and then outwardly towards the opening 2. At the rear of the oven the conveyor turning point wheels 5 have their axes substantially in the plane of or somewhat above that of the horizontal partition.

Any suitable form of heating elements is provided in the chambers A and B—in the drawings top and bottom heat sources 6 and 7 being shown in the chamber A and a bottom heat element 8 indicated in the chamber B. Steam injection for the chamber A may be provided in any suitable known manner for supplying the steamy atmosphere required for this chamber, and the steam ceiling level in the chamber may depend upon the position or adjustment of oven atmosphere withdrawal means or any suitable means provided for determining such. The draw-off for the oven atmosphere according to this form of the invention is situated behind the rear turning point wheels 5 low down in the rear wall. It is convenient to back the aperture by an outlet chamber, which communicates through a suitable conduit with a draught chimney or with the suction of an extraction fan.

According to Figure 1 a single aperture 9 is located low down in the rear wall and has a single valve member 10 of the pivoted arcuate type installed and operable by a hand wheel 10a, the form and arrangement being such that when the arcuate valve member 10 is in the mid position minimum openings of equal area at the points 9a and 9b are afforded. When the member 10 is moved upwardly the clearance 9a is closed and the clearance 9b is opened more fully, and vice versa when the member is moved downwardly.

The slotted aperture 9 backed by the suction chamber 11 is coupled to an upward conduit or flue 12 which may be connected to a chimney or to a suction fan (not shown). In order to vary the suction effect at the draw off aperture 9 it is preferred to install in the chamber 11 or in the conduit between the chamber 11 and the chimney or fan, a flap or other valve 13 operable by a hand wheel 13a for venting the suction to the outer atmosphere to afford a variable short-circuit which admits air to the fan suction or chimney, and proportionately reduces the suction at the aperture 9.

Figure 2:
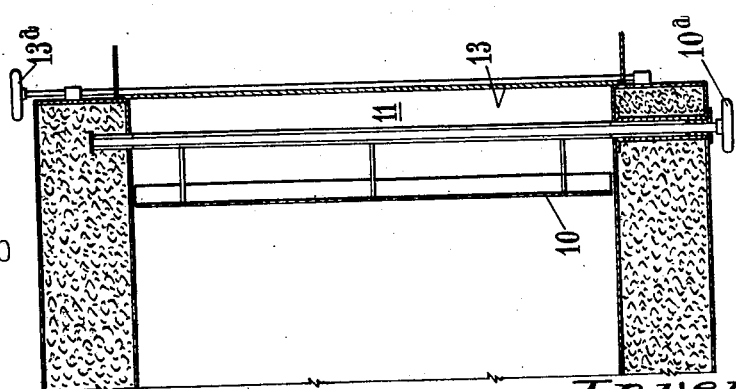
Figure 2 is a fragmentary diagrammatic sectional plan view of the rear end of the oven seen in Figure 1.

According to the modification of the arrangement shown in Figures 1 and 2 a single outlet 9 (see Figure 3) is provided in the rear wall of the oven chamber in the vicinity of the central plane of the oven. This aperture 9 is backed by a chamber 11 and connected via conduit 12 to the suction of a fan 12a or to a chimney as already described.

The valve means employed for controlling the aperture 9 in this instance comprise a pair of arcuate valve members 10a, 10b, slidable one over the other, each being independently operable by a hand wheel. By adjusting these valve members the rate of withdrawal at the lips 9a, 9b may be independently varied. In Figure 3 the flap valve 13 is replaced by a vertically reciprocable damper 13 which is operated through a rack 13b and pinion 13c from the hand wheel 13a.

In carrying the invention into effect according to the example shown in Figure 4, the withdrawal means and arrangement of valve members described in connection with Figure 3 may be similarly employed in conjunction with an outlet aperture 14 in the roof of the upper chamber A of the oven, this outlet being preferably located over the rear turning wheels of the conveyor. The withdrawal aperture 9 in this instance is suitably located in the lower part of the rear wall of the oven. A valve or damper 14a controls the escape or withdrawal of the steamy atmosphere through the outlet 14.

When using this form of the invention extraction of oven atmosphere is effected at 14 from the upper chamber and some may also be withdrawn through the upper side of the outlet 9. Alternatively, the valve means 10a, 10b may be adjusted to withdraw atmosphere solely from the lower chamber B, or the withdrawal from both chambers A and B may take place through the outlet 9 when the damper 14a in the roof outlet 14 is closed.

Figure 5 illustrates a modification of the invention in which oven atmosphere extracted at a rear outlet is recirculated. This figure also serves to illustrate the employment of a transverse conduit 9c having a longitudinal slot 9d, located within the oven in substitution for the outlet aperture in the rear wall of the oven as hitherto described. This conduit is connected to an upward flue 12 coupled to the suction of a fan located at 12a and discharging to a branch 15 connected to a second transverse conduit 16 located in the roof of an oven. This conduit has a longitudinally extending slot 16a through which the recirculated atmosphere passes into the oven. The conduit 15 is provided with an outlet 17 having a damper or valve 17a. Another valve or damper 18 is provided in the passage to the conduit 16 such that by appropriate adjustment of the valves 17a and 18 a variable quantity of the atmosphere may be recirculated whilst a spill-over or discharge of the residue takes place through the passage 17.

Both conduits 9c and 16 may have their apertures 9d and 16a controlled by valve means as described in reference to Figure 1 or 3 of the drawings.

In each of the applications of the invention described above the direction of the withdrawal currents is indicated by the arrows, and the operation of the oven may be regulated by the adjustment of the valve means at the withdrawal aperture or apertures 9 or 14 or 9d and 16a, to effect withdrawal from the upper chamber A or from the lower chamber B, or from both chambers together in adjustable proportions to effect the exclusion of steam from the lower chamber and ensure a substantially dry heat baking therein.

In addition to the withdrawal from both or either chambers the recirculation (according to the arrangement shown in Figure 5) of the atmosphere from the conduit 16 towards the conduit 9c further tends to prevent steam creeping into the lower chamber by forming a curtain across the rear turning point wheels 5.

In each application of the invention the withdrawal from the chamber (or chambers) is effected in varying degrees such that a substantially static condition with a trend towards the rear of the oven may be established in the chambers or a definite flow condition established in either. In the dry heat chamber the direction of movement of the atmosphere therein is always counter to the direction of travel of the lap of the tray conveyor therein.

I claim:

1. A baker's oven comprising a chamber, a partition in said chamber dividing it into upper and lower compartments, an endless conveyor means comprising an upper outward lap and a lower return lap, said laps being located respectively in the upper and lower compartments, a charging and delivery opening at the front of the oven, an opening in the rear wall of the oven extending transversely across the chamber, valve means for controlling said rear wall opening, suction extraction means connected to said rear wall opening for maintaining a movement of the oven atmosphere from front to rear of the upper compartment and preventing steam therefrom entering the lower compartment.

2. A baker's oven comprising a chamber, partition means in said chamber dividing it into upper and lower compartments, an endless conveyor means having an outward lap in the upper compartment and a return lap in the lower compartment, a charging and delivery opening at the front of the oven, a valve controlled outlet opening in the rear wall of the oven extending transversely across the chamber, and suction means coupled to said outlet opening, whereby variable proportions of the oven atmosphere may be withdrawn from the upper and lower compartments to provide a movement of the atmosphere from front to rear of both of said compartments, such that steam treatment is confined to the upper compartment and dry heat baking is effected in the lower compartment.

3. A baker's oven as claimed in claim 2 wherein a single elongated adjustable valve member is located to control said outlet opening, such that as said valve member is adjusted transversely of said opening to cause an increase in the amount of oven atmosphere withdrawn from one compartment, the amount of oven atmosphere withdrawn from the other compartment is correspondingly reduced.

4. A baker's oven as claimed in claim 2, wherein said outlet opening opens into a chamber connected to the suction means, said chamber having a valve controlled inlet for the admission of atmospheric air into said chamber between said outlet opening and the source of suction.

JOHN EDWARD POINTON.

References Cited in the file of this patent

UNITED STATES PATENTS

| Number | Name | Date |
|---|---|---|
| 1,999,503 | Houlis | Apr. 30, 1935 |
| 2,052,060 | Sperling | Aug. 25, 1936 |
| 2,256,003 | Patterson | Sept. 16, 1941 |